UNITED STATES PATENT OFFICE.

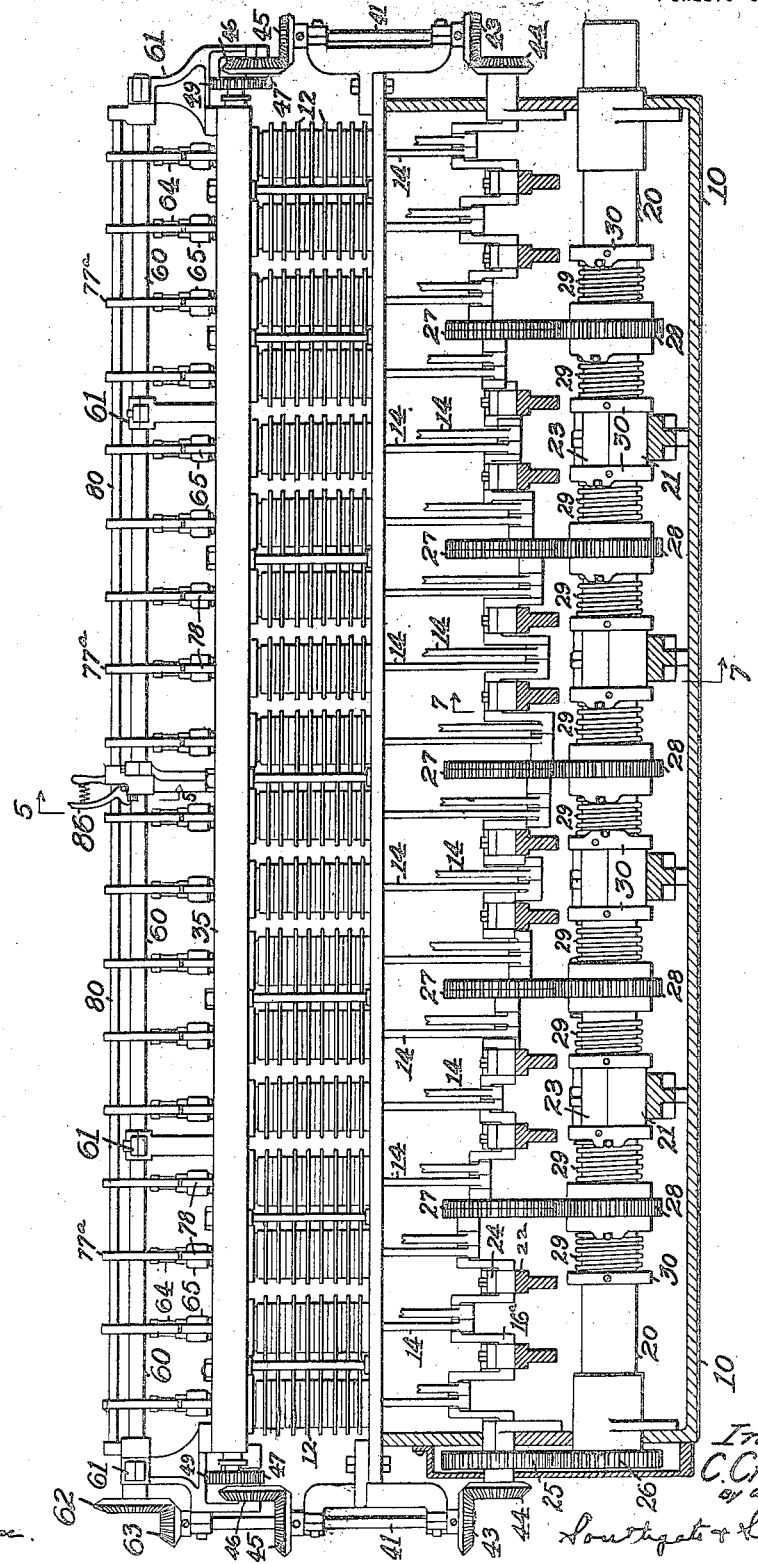

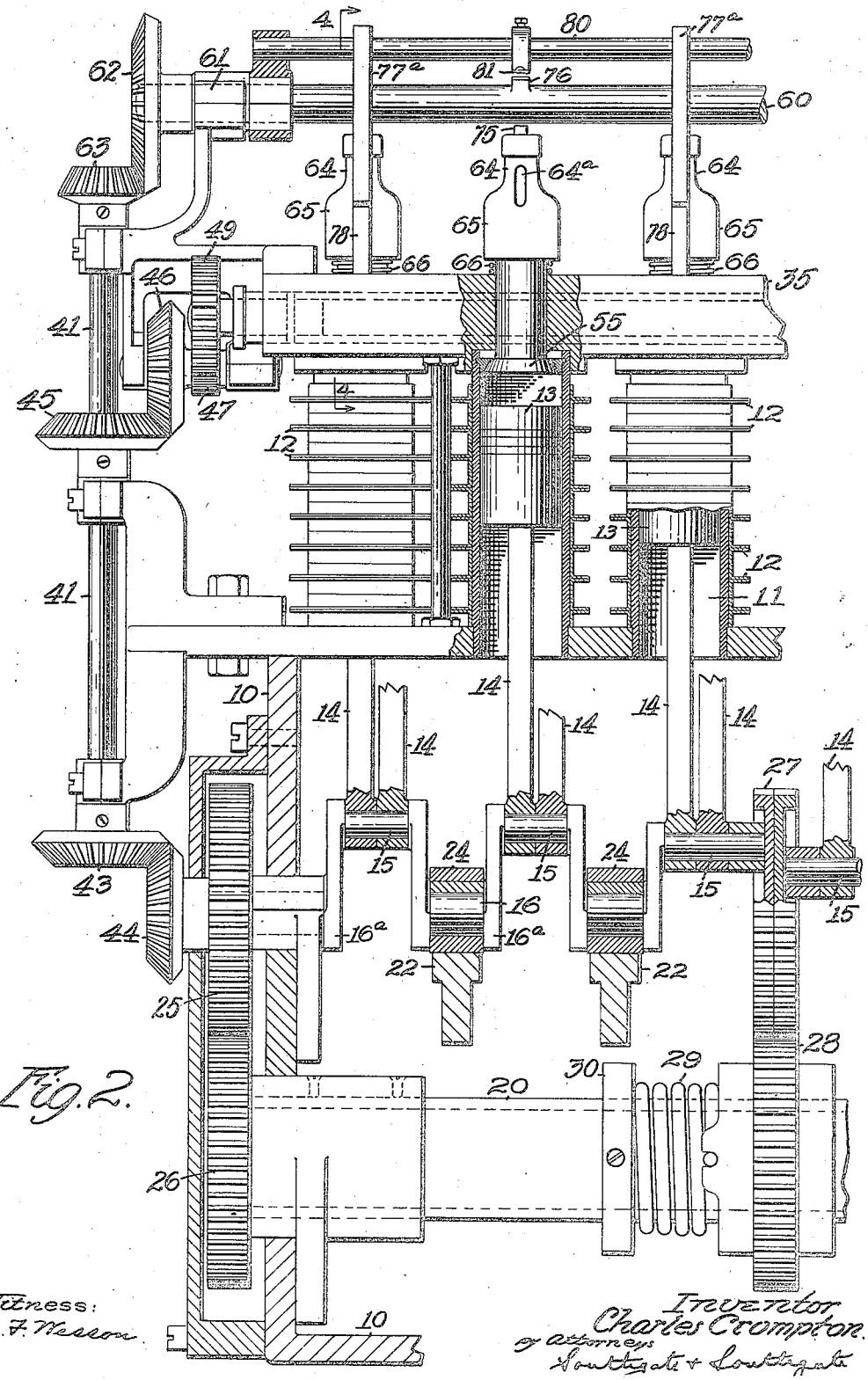

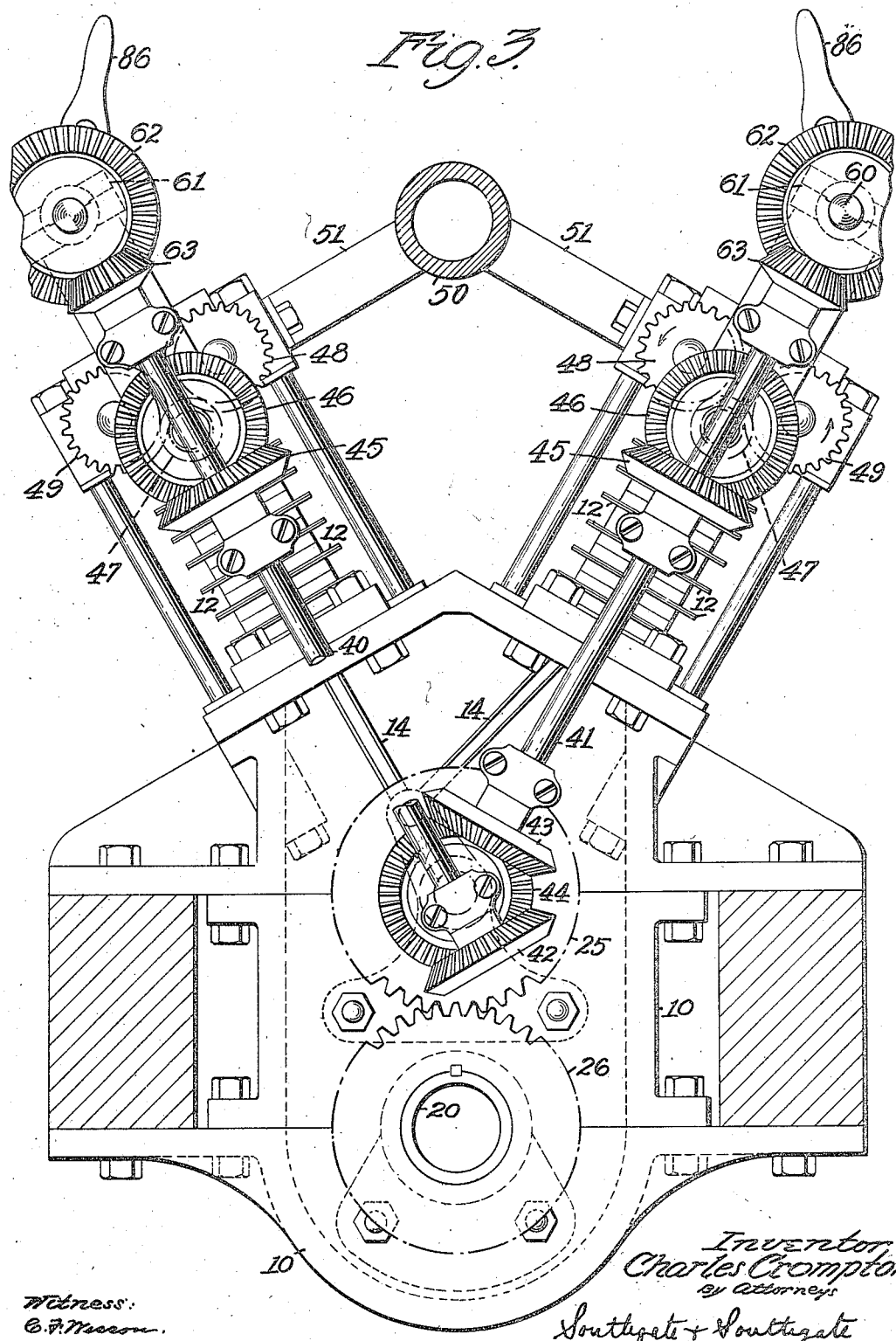

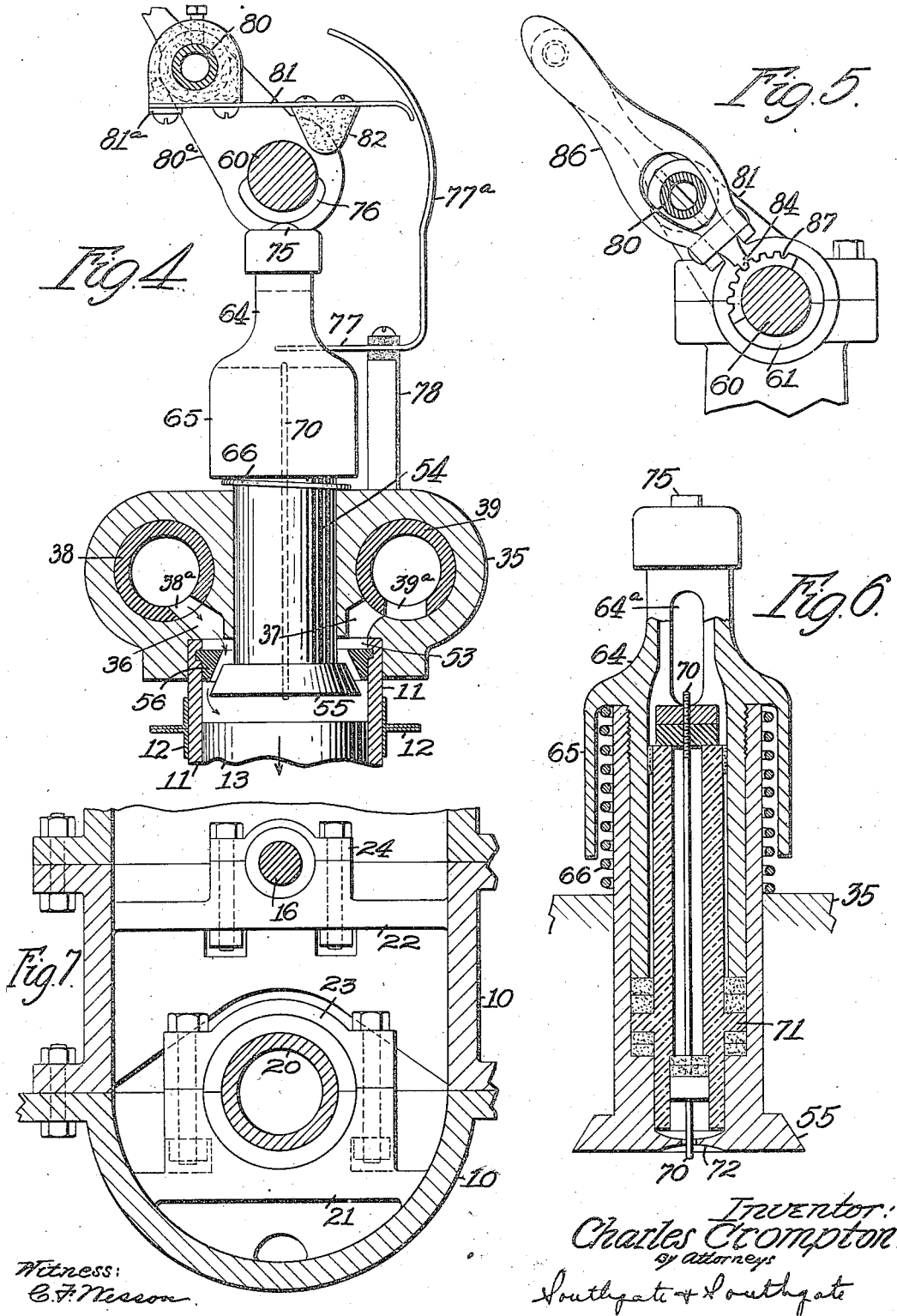

CHARLES CROMPTON, OF WORCESTER, MASSACHUSETTS.

GAS-ENGINE.

1,241,199.　　　　　　　　Specification of Letters Patent.　　Patented Sept. 25, 1917.

Application filed January 3, 1916.  Serial No. 69,815.

*To all whom it may concern:*

Be it known that I, CHARLES CROMPTON, a citizen of the United States, residing at Worcester, in the county of Worcester and State of Massachusetts, have invented a new and useful Gas-Engine, of which the following is a specification.

This invention relates to a gas engine of the multi-cylinder type. For certain purposes and notably for aeroplane propulsion it is necessary to provide gas engines of great power and also capable of running at very high speed. Cylinders of large diameter and long stroke are not adapted for high speed and accordingly it is customary to provide an increased number of small cylinders where an increase in power is necessary. This increase in the number of cylinders directly increases both the length of the crank shaft and the torsional force acting thereon. Suitable provision for such increase is exceedingly difficult in the usual type of engine in which the power is taken off of the crank shaft at one end only.

Accordingly it is one object of my invention to provide an improved transmission construction by means of which the stress upon any part of the crank shaft may be kept within reasonable limits regardless of the number of cylinders or of the total power developed. To the accomplishment of this object, I provide a second shaft parallel to the crank shaft and herein termed the "transmission shaft" and I also provide a plurality of separate driving connections from the crank shaft to the transmission shaft. These driving connections take off the power from the crank shaft at a series of separated points along the length of the crank shaft, thus greatly reducing the stress at any given point in the shaft.

It is desirable to provide means for distributing and equalizing the stresses along these two parallel shafts and one feature of my invention relates to the provision of yielding driving connections between the crank shaft and the transmission shaft through which the shafts can adjust themselves to varying conditions of load and power application.

Further objects of my invention relate to the provision of improved and simplified valve mechanism and firing mechanism for a multi-cylinder gas engine. In the preferred embodiment of these last-mentioned improvements I utilize revolving cylindrical valves to control the fuel admission and the exhaust and in addition I provide a puppet valve which closes the end of the cylinder during the compression and explosion of the charge and thus relieves the pressure upon the revolving valves. I also associate the firing device with the puppet valve in such a manner that the firing circuit cannot be closed while the puppet valve is open.

Other features of my invention relate to certain arrangements and combinations of parts which will be hereinafter described and more particularly pointed out in the appended claims.

A preferred form of my invention is shown in the drawings in which—

Figure 1 is a side elevation partly in section of my improved engine;

Fig. 2 is a similar view of a portion of the engine on an enlarged scale;

Fig. 3 is a left-hand end elevation of the engine;

Fig. 4 is a detail end elevation, partly in section, of the valve mechanism and firing devices;

Fig. 5 is a detail view of an adjusting device;

Fig. 6 is a sectional elevation taken through the center of the puppet valve and spark plug, and Fig. 7 is a detail end elevation of a pair of shaft bearings.

Referring to Figs. 1 and 3, I have shown my invention embodied in a thirty-six cylinder gas engine, the engine being of the twin type and having two sets of 18 cylinders each. The engine is provided with the usual frame or bed 10 to which the cylinders 11 are securely bolted.

Each cylinder, as shown in Fig. 4, is provided with straight cylindrical side walls, the radiating effect of which is increased by the provision of a series of flanged rings 12 encircling the cylinder. These rings are L-shaped in transverse section and are oppositely disposed in pairs along the length of the cylinder. The rings are preferably made of aluminum or of some other light metal of good conductivity and by their use I materially increase the radiating surface of the cylinder without correspondingly increasing the weight thereof.

Each cylinder is provided with the usual piston 13 (Fig. 2) and the usual connecting rod 14 joins the piston to a crank pin 15 on the crank shaft 16. The corresponding pistons of the two sets of cylinders are connected to a single crank pin 15. Reference to Fig. 1 will show the length and complexity of the crank shaft 16 required for operation with thirty-six cylinders and it will be seen that the torsional stress would be prohibitive if the power of the thirty-six cylinders was all transmitted to one end of the shaft or even if it was divided between the two ends of the shaft.

In order to overcome this difficulty I have formed the crank shaft of my improved engine in a series of sections 16ª and at the left-hand end of each section, as viewed in Fig. 1 I have provided a driving connection to a transmission shaft 20. The crank shaft and the transmission shaft are supported parallel and adjacent to each other in numerous bearings rigidly secured to the frame 10.

These bearings are shown in detail in Fig. 7, and comprise a lower bearing 21 for the transmission shaft 20 and an upper bearing 22 for the crank shaft 16, the bearings 21 and 22 being provided with movable caps 23 and 24 to permit easy removal of the shafts from the bearings. The bearings are conveniently supported by webs or flanges formed integral with the casing 10, and extending across the casing from one side to the other.

A gear 25 is secured to the crank shaft 16 at one end thereof and meshes with a similar gear 26 mounted on the end of the transmission shaft 20. Similar gears 27 are formed between the sections 16ª of the crank shaft 16, each gear 27 meshing with a corresponding gear 28 loose upon the transmission shaft 20. The teeth of the gears 27 are cut in flanges formed on the ends of the crank shaft sections, these flanges being machined and rigidly secured to each other and the gear teeth being thereafter cut around the periphery to form a single gear.

Each gear 28, as mentioned above, is loosely mounted on the shaft 20 and is connected thereto by heavy coil springs 29 positioned on each side of the gear 28 and engaging the gear and also engaging collars 30 rigidly mounted on the shaft 20. By this provision of driving gears and spring connections throughout the length of the shafts the power is taken off from the crank shaft at a series of separated points and is yieldingly transferred to the transmission shaft 20.

The transmission shaft is tubular, (Figs. 3 and 7) and may be easily made of a diameter sufficient to transmit the entire pull of the engine. Such an increase in diameter is not possible in the crank shaft, in which the short throw of the crank pins and the closeness of their arrangement strictly limit the permissible diameter of the crank shaft.

The cranks are so arranged that the cylinders act successively from one end of the engine to the other and the transmission devices described prevent the stress upon the shaft from becoming excessive at any time or at any point in the shaft.

As shown in the drawings, the gears 27 and 28 are so disposed that they divide the engine into successive groups of six cylinders each, but it will be understood that my invention is not limited to this particular arrangement.

The cylinder 11 is secured at its upper end in a casting 35 having formed therein an admission port 36 and an exhaust port 37. These ports are controlled by rotating cylindrical valves 38 and 39 respectively. For rotating these valves I provide inclined shafts 40 and 41 mounted on the end of the casing 10 and driven through beveled gears 42, 43 and 44 from the crank shaft 16.

As the valve mechanism used in both sets of cylinders is identical, a description of the mechanism in one set will be sufficient. The inclined shaft 41 is provided at a point intermediate its ends with a beveled gear 45 meshing with a similar beveled gear 46 which latter gear carries a pinion 47 meshing with gears 48 and 49 connected to drive the cylindrical valves 38 and 39.

The inlet valve 38 is tubular in form, extending the length of the engine and provided with openings 38ª, each adapted to register with an inlet port 36 at each revolution of the valve. The fuel supply is taken from a header 50 (Fig. 3) provided with one or more cross connections 51 on each side through which the fuel is conveyed to the interior of the rotating valve 38.

The exhaust valve 39 is similar in construction and is provided with a series of openings 39ª each adapted to register with one of the exhaust ports 37 at each revolution of the valve, the exhaust gases passing through the hollow interior of the valve and being removed therefrom at the ends or in any convenient manner.

The ports 36 and 37 (Fig. 4) do not lead directly into the end of the cylinder 11 but connect into an annular space 53 surrounding the stem 54 of a puppet valve 55 and separated from the cylinder by an inwardly projecting flange or partition 56. The opening in this flange or partition is normally closed by the puppet valve 55 and is opened at proper intervals by the depression of said valve. Such depression or opening of the puppet valves of each series of cylinders is controlled by a separate cam shaft 60 mounted in bearings 61 secured to the upper part of the frame 10. At one end, each shaft 60 is provided with a beveled gear 62 meshing with and driven by a pinion 63 upon the upper end of the shaft 40 or 41.

The construction of the puppet valve is best shown in Fig. 6, in which it will be seen that the stem 54 extends upward through its bearing in the casting 35 and is secured at its upper end to a cap 64 having a depending outer sleeve 65. A coil spring 66 is positioned between the stem 54 and the sleeve 65 and engages the casting 35, serving to maintain the valve 55 normally in raised position.

A spark plug for each cylinder is disposed centrally within each puppet valve, the spark plug comprising a terminal rod 70 extending through a porcelain sleeve 71 and adapted to form a spark between itself and the inner edge of an internal flange 72 formed on the valve 55 and adjacent said rod. The rod 70 and sleeve 71 are held within the valve in any customary and convenient manner and the upper end of the rod extends into a slot 64ª in the cap 64.

A roll 75 projects beyond the upper end of the cap 64 into position for engagement with a cam surface 76 formed upon the valve shaft 60 (Fig. 4). It will be understood that the shaft 60 is provided with a succession of cam surfaces 76 each adapted to coöperate with the puppet valve and spark plug of one of the cylinders.

When the valve is released by its cam surface 76 and is raised by its spring 66 the upper end of the rod 70 is brought into engagement with a contact member 77 mounted upon but insulated from a post 78 and having an upwardly extending curved portion 77ª forming an auxiliary contact member through which the firing circuit is closed by a device to be now described.

A rod 80 mounted in bearings adjacent the shaft 60 extends lengthwise of the machine and supports a series of spring contact members 81. Each member 81 is insulated from the rod 80 and is separately secured thereto, the free end of the member being adjacent to the curved end 77ª of the contact member 77. The members 81 are connected to a bar 81ª extending the length of the engine and connected at its middle portion to a suitable source of current. Each member 81 is positioned for engagement with the corresponding cam 76 upon the cam shaft 60. When thus engaged the contact member 81 will be raised and brought into engagement with the contact member 77. If the puppet valve is already closed the circuit is thus completed and the charge will be exploded, the spark being formed between the terminal 70 and the flange 72.

It will be evident that in this arrangement the explosion can only occur when the puppet valve is raised. When thus raised the valve closes the end of the cylinder 11 and relieves the rotating valves 38 and 39 from the explosion pressure.

It is not absolutely essential that the members 70 and 77 should be arranged to break the circuit whenever the valve 55 is opened. The part 77 may be formed of resilient material so that it will follow and continuously engage the part 70, but the arrangement first described is the preferred form and eliminates the danger of premature explosions.

The time of closing the contact between the member 81 and the curved extension 77ª may be varied by changing the position of the supporting rod 80. This rod is carried in arms 80ª angularly movable about the axis of the valve shaft 60, and the parts may be retained in adjusted position by causing the tooth 84 (Fig. 5) upon the hand-lever 86 to engage any selected notch 87 upon the outer face of the bearing 61. The lever 86 is secured to and movable with the rod 80. Thus by swinging the arms 80ª which support the rod 80 about the axis of the shaft 60 the time of engagement of the projection 82 by the cam 76 may be advanced, thus changing the timing of the firing spark. The cams 76 are disposed throughout the length of the cam shaft 60 in suitable angular relation so that the cylinders will be fired successively from one end of each set to the opposite end.

It should be noted that the distance from the point at which the circuit is closed between each member 81 and the corresponding contact member 77 to the corresponding spark gap is substantially uniform throughout the entire series of cylinders. This arrangement tends to produce uniformity of action in the cylinders and greatly simplifies the wiring system of the engine.

From this description of the details of my improved gas engine it will be evident that I have devised an exceedingly simple mechanism for regulating and firing the large number of cylinders shown in the drawings and it will also be evident that the number of cylinders can be further extended at will, such extension involving no additional stress upon the crank shaft, owing to the separate spaced driving connections between the crank shaft and the transmission shaft.

The term "gas engine" as used in this specification and in the appended claims should be understood to cover any internal-combustion engine in which gaseous or vaporized fuel is used.

Having thus described my invention it will be evident that changes and modifications can be made therein by those skilled in the art without departing from the spirit and scope thereof as set forth in the claims and I do not wish to be otherwise limited to the details herein disclosed.

What I claim is:—

1. A gas engine having, in combination, a plurality of cylinders, a piston for each cylinder, a crank shaft, connections from each of said pistons to said crank shaft, a transmission shaft supported in fixed relation to said crank shaft, and a plurality of separate driving connections from said crank shaft to said transmission shaft, said cylinders being arranged in successive groups and certain of said driving connections being disposed between adjacent groups.

2. A gas engine having, in combination, a frame, a plurality of cylinders, a piston for each cylinder, a crank shaft, connections from each of said pistons to said crank shaft, a transmission shaft supported in said frame parallel to said crank shaft, a series of spaced gears fixed to said crank shaft, a corresponding series of gears loosely mounted on said transmission shaft, and resilient connections between said last named gears and said transmission shaft.

3. A gas engine having, in combination, a frame, a plurality of cylinders, a piston for each cylinder, a single crank shaft formed in sections rigidly secured together, each section being connected to the pistons of a group of cylinders, a series of gears disposed at the ends of the crank shaft sections, a transmission shaft supported adjacent said crank shaft, and a second series of gears mounted on said transmission shaft and meshing with said first named gears.

In testimony whereof I have hereunto set my hand.

CHARLES CROMPTON.